I. L. EDWARDS.
NUT AND BOLT LOCK.
APPLICATION FILED JAN. 23, 1909.
1,080,752.
Patented Dec. 9, 1913.
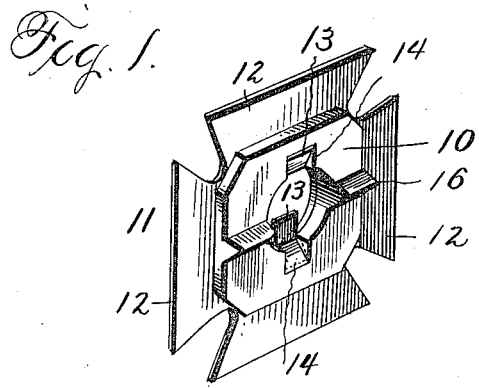
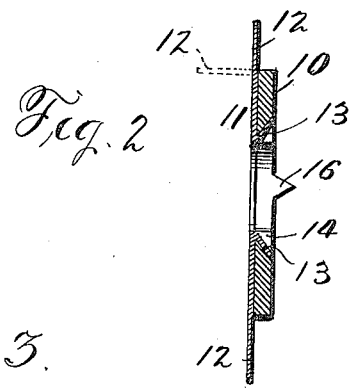
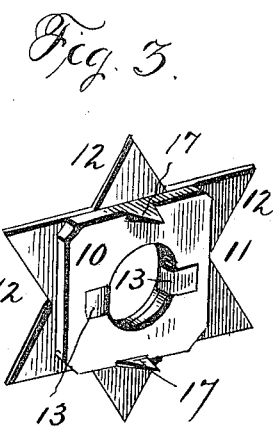
Witnesses
Inventor
Isaac L. Edwards
By Chas. J. Williamson
Attorney

UNITED STATES PATENT OFFICE.

ISAAC L. EDWARDS, OF AURORA, ILLINOIS.

NUT AND BOLT LOCK.

1,080,752.

Specification of Letters Patent.     Patented Dec. 9, 1913.

Application filed January 23, 1909. Serial No. 473,850.

*To all whom it may concern:*

Be it known that I, ISAAC L. EDWARDS, of Aurora, in the county of Kane and in the State of Illinois, have invented a certain new and useful Improvement in Nut and Bolt Locks, and do hereby declare that the following is a full, clear, and exact description thereof.

The object of my invention is to provide a nut and bolt lock of the bendable plate or washer type, adapted for use with either metal or wooden surfaces, and while being simple in construction, will possess a member for engaging the wood, metal or other surface that can be used repeatedly, notwithstanding the wearing out or destruction of the bolt or nut-engaging member, and to the end of producing a thoroughly practical and efficient lock of this description, my invention consists in the device constructed substantially as hereinafter specified and claimed.

Referring to the drawings, Figure 1 is a perspective view of a nut lock embodying my invention, adapted for use on wood, metal or other surfaces harder than wood; Fig. 2 is a vertical section thereof. Fig. 3 is a perspective view of a different form of nut lock embodying my invention and adapted especially for use with wood.

Broadly or generally described, my nut lock consists of a two-part washer, one part or member 10 being a stiff or unyielding plate adapted to engage the surface or part by which the washer is prevented from turning, and the other part or member 11 consisting of a bendable or flexible sheet metal washer having around its rim or edge a plurality of fingers or lugs 12 adapted to be bent into engagement with the nut or bolt head to prevent the same from turning, or to be bent out of engagement therewith when it is desired to remove the nut or bolt. But one finger or lug 12 will be bent into engagement with the nut or bolt at a time, so that if during the use of the lock a finger or lug be broken off, another one can be used, and so on until all are used up. When completely used up, a new member 11 can be employed with the same stiff or unyielding member 10. Preferably I connect the two members 10 and 11 together by providing one or more tongues 13 on the bendable plate 11, that project radially into the bolt hole, (see Fig. 1) and for engagement by each lug the stiff or unyielding member 10 is provided on its side opposite that to which the member 11 is applied with a notch or depression 14 into which said tongue 13 may be bent, so that it will lie within the inner surface of the member 10, which is the surface that abuts against the fish plate or other part to which the bolt and nut are applied. The tongue engaging surface of the notch 14 is inclined so that the member 10 is overlapped by the tongue, which thus extends outwardly or in a direction crosswise of the bolt axis, and hence, the two members are connected together so they cannot accidentally fall apart in any direction, but in effect, constitute a single element when assembled.

In the form of my invention illustrated in Figs. 1 and 2, the rigid or stiff plate 10 has teeth 16 wedge-shape in form, that are adapted to bite into either wood or metal, or to be received into cavities provided for the purpose, to hold the washer from turning; while in the form of my invention illustrated in Fig. 3, teeth 17 are provided suitable for being embedded in wood or other readily penetrated substance.

Besides the important advantage of permitting the same rigid or stiff plate forming the member 10 to be used over and over again with new bendable members 11, it will be seen that by forming the washer of two plates, one stiff and the other yieldable, it possesses the important qualities of stiffness and rigidity that are required for securely locking or holding the device, together with bendability or flexibility for easily and quickly placing the washer into or out of engagement with the bolt head or the nut.

Having thus described my invention, what I claim is—

A two part bolt and nut lock comprising in combination a stiff or rigid plate perforated to receive the bolt and formed with a series of radial recesses around the bolt hole extended radially farther from the axis on the face opposite from the companion part, said face being provided with engaging points or projections for engaging the surface of the structure to which the device is applied, and a flexible or bendable part perforated to receive the bolt and provided with tongues which are received and embedded in the recesses of the rigid part with their points engaging the outwardly extending radial enlargements thereof to clamp the parts securely together and hold them against displacement relative to each other, the said flexible part being provided with separate exterior tongues extended in the plane of the part beyond the edges of the rigid plate, and adapted to be bent over upon and into engagement with the sides of a nut.

In testimony that I claim the foregoing I have hereunto set my hand.

ISAAC L. EDWARDS.

Witnesses:
CHAS. P. FRUNGER,
A. L. LONG.

Copies of this patent may be obtained for five cents each, by addressing the "Commissioner of Patents, Washington, D. C."